cludes a relatively low voltage power source 84 electrically connected between one side of the relay and some conductive portion of the apparatus housing, table or base, indicated in the diagram as ground. The other end of the relay is connected to wire 74 of contact unit 46. Consequently, when handle 52 is turned clockwise to tightly clamp the table surface 62 of shoe 60 engages contact ball 68 to complete the relay circuit and to thereby actuate the relay and open the motor circuit so that the motor cannot be operated with the clamp thus locked. When handle 52 is turned counterclockwise to bring shoe 60 out of engagement with clamp element 34 to thereby release the clamp the relay circuit is opened and relay 82 returns to its normally closed position to allow operation of the drive motor. In the event a non-electrical motor is used the circuit can be modified in an obvious manner so that the relay circuit will disable an electrical control circuit for the motor.

One application in which applicant has found great utility for the subject invention is in conjunction with power driven dividing heads, such as shown somewhat schematically in FIGURE 7. Generally speaking, such a dividing head might comprise a main housing 86 having a spindle 88 thereon pivotally supporting a dividing head 90, in turn rotatably supporting power operated table 10 having flange 25 thereon. A hand wheel, such as shown at 92 may be provided for tilting dividing head 90. Like reference numerals are used to designate the various components of the locking device itself, which is operated in the manner described above. After a workpiece has been secured to table 10 and the table and workpiece accurately positioned in the exact position desired, the locking device may be actuated to tightly lock the table against rotation and disable the driving motor therefor. The workpiece may then be machined right on the dividing head without fear of its losing its accurately defined position or injury to the relatively delicate driving head. Any forces on the workpiece caused by machining tending to rotate table 10 are absorbed by the locking device and not the rotating mechanism of the dividing head.

Thus, there is disclosed in the above description and in the drawings an exemplary embodiment of the invention which fully and effectively accomplishes the objects thereof. However, it will be apparent that variations in the details of construction may be indulged in without departing from the sphere of the invention herein described, or the scope of the appended claims.

What is claimed is:

1. A device for locking a motor driven table or the like movably mounted upon a base, comprising means defining opposed gripping surfaces on the table having axes extending in the direction of movement of the table, first and second opposed clamping elements secured to the base and mounted for pivotal movement both with respect to each other and to the table, means for firmly urging said clamping elements together to clamp said gripping surfaces therebetween, said last-mentioned means applying substantially equal forces to each of said clamping elements, and means responsive to the clamping movement of said clamping elements to disable the table driving motor while the table is clamped.

2. A device for locking a motor driven table or the like movably mounted upon a base, comprising means defining opposed gripping surfaces on the table having axes extending in the direction of movement of the table, first and second opposed clamping elements secured to the base and mounted for pivotal movement with respect to each other, locking means on one of said clamping elements and engageable with the other clamping element for firmly urging said clamping elements together with substantially equal forces to clamp said gripping surfaces therebetween, and electrical means responsive to the clamping movement of said clamping elements to disable the table driving motor while the table is clamped, said electrical means including a switch mounted on one of said clamping elements and actuated by said locking means, said switch including a resiliently biased contact engageable directly by said locking means.

3. A device for locking a motor driven table or the like rotatably mounted upon a base, comprising means defining opposed gripping surfaces on the table, first and second opposed clamping elements secured to the base and mounted for pivotal movement both with respect to each other, locking means threadably mounted on one of said clamping elements and engageable with the other of said clamping elements for firmly urging said clamping elements together with substantially equal forces to clamp said gripping surfaces therebetween, contact means mounted on said other of said clamping elements adapted to be engaged by said locking means when actuated, means creating an elecrtical potential between said contact means and said locking means, and electrical means responsive to the drop in potential between said contact means and locking means caused by their engagement to disable the table driving motor while the table is clamped.

4. A device for locking a motor driven table or the like rotatably mounted upon a base, comprising means defining opposed gripping surfaces on the table, first and second opposed clamping elements secured to the base and mounted for pivotal movement both with respect to each other and said table, locking means threadably mounted on one of said clamping elements and engageable with the other of said clamping elements for firmly urging said clamping elements together with substantially equal forces to clamp said gripping surfaces therebetween, contact means mounted on said other of said clamping elements adapted to be engaged by said locking means when actuated, means creating an electrical potential between said contact means and said locking means, and electrical means responsive to the drop in potential between said contact means and locking means caused by their engagement to disable the table driving motor while the table is clamped.

5. A device for locking a motor driven table or the like rotatably mounted upon a base, comprising means defining opposed cylindrical gripping surfaces on the table concentric with one another and the axis of rotation of said table, first and second opposed clamping elements secured to the base and mounted for pivotal movement both with respect to each other and radially with respect to the table, manually operable locking means threadably mounted on one of said clamping elements and engageable with the other of said clamping elements for firmly urging said clamping elements together with substantially equal forces to clamp said gripping surfaces therebetween, resiliently biased contact means mounted on said other of said clamping elements adapted to be engaged by said locking means when actuated, means creating an electrical potential between said contact means and said locking means, and electrical means responsive to the drop in potential between said contact means and locking means caused by their engagement to disable the table driving motor while the table is clamped.

6. A device for locking a motor driven table or the like rotatably mounted upon a base, comprising means defining opposed cylindrical gripping surfaces on the table concentric with one another and the axis of rotation of said table, first and second opposed clamping elements secured to the base and mounted for pivotal movement both with respect to each other and radially with respect to the table, shoes of friction material mounted on the ends of said clamping members, manually operable locking means threadably mounted on one of said clamping elements and engageable with the other of said clamping elements for firmly urging said shoes on said clamping elements toward one another with substantially equal forces to clamp said gripping surfaces therebetween, each of said shoes having an arcuate surface adapted to mate